(12) United States Patent
Haddad et al.

(10) Patent No.: US 9,118,681 B2
(45) Date of Patent: Aug. 25, 2015

(54) MIST NETWORKS

(71) Applicant: Telefonaktiebolaget L M Ericsson (publ), Stockholm (SE)

(72) Inventors: Wassim Haddad, San Jose, CA (US); Joel Halpern, Leesburg, VA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 13/909,958

(22) Filed: Jun. 4, 2013

(65) Prior Publication Data

US 2014/0258376 A1    Sep. 11, 2014

Related U.S. Application Data

(60) Provisional application No. 61/775,054, filed on Mar. 8, 2013.

(51) Int. Cl.
G06F 15/16 (2006.01)
H04L 29/08 (2006.01)
G06F 9/48 (2006.01)
H04L 12/58 (2006.01)
G06F 9/50 (2006.01)

(52) U.S. Cl.
CPC .......... *H04L 67/1002* (2013.01); *G06F 9/4856* (2013.01); *H04L 67/10* (2013.01); *H04L 67/34* (2013.01); *G06F 9/5088* (2013.01); *H04L 51/38* (2013.01)

(58) Field of Classification Search
CPC ..... H04L 67/1002; H04L 67/34; H04L 67/10; G06F 9/4856
USPC .......................................................... 709/203
See application file for complete search history.

(56) References Cited

U.S. PATENT DOCUMENTS

| 2008/0126511 | A1 | 5/2008 | Appaji |
| 2010/0287263 | A1 | 11/2010 | Liu et al. |
| 2011/0289205 | A1 | 11/2011 | Hansson et al. |
| 2011/0320520 | A1* | 12/2011 | Jain ............................... 709/203 |

* cited by examiner

*Primary Examiner* — Krisna Lim
(74) *Attorney, Agent, or Firm* — Nicholson De Vos Webster & Elliot, LLP

(57) ABSTRACT

A method is implemented by a nano-box for providing processing resources to support application execution to a set of devices connected to a network of the nano-box. The method includes receiving application data for an application for a mobile or fixed device. The application is executed using the application data of the mobile or fixed device to generate an output. A handoff notification is received indicating that the root controller has reassigned the application to another nano-box in the set of nano-boxes based on best resource availability and minimum latency. In response, the nano-box updates the application data with a current state of the application and transmits the updated application data over the network to be provided to the other nano-box.

18 Claims, 2 Drawing Sheets

MIST NETWORKS

CROSS-REFERENCE TO RELATED APPLICATION

The present application claims priority from U.S. Provisional Patent Application No. 61/775,054, filed on Mar. 8, 2013.

FIELD OF THE INVENTION

The embodiments of the invention relate to the field of cloud computing. Specifically, the embodiments relate to offloading the processing and storage of a mobile or fixed device to servers with resource availability and minimum latency.

BACKGROUND

Mobile devices are desirable to users because of their portability and size. However, mobile devices typically have limited processing power and storage space as a result of their small size. Some applications have been designed to accommodate the processing and storage limits of mobile devices. Other applications, such as augmented reality, speech translation and face recognition, have extensive processing and storage requirements that cannot be met by a mobile device.

To make these processing resource intensive applications accessible to the users of mobile devices, some or all of the processing and/or storage can be offloaded to a server. The server typically resides in a large datacenter that is remote from the mobile device, but can provide tremendous amounts of processing power and storage capacity. After the server performs the processing for an application, the output of the application is transmitted to the mobile device and presented to the user. However, the user experience of using such applications is diminished by the latency between the mobile device and the data center. The applications do not promptly process the data due to the distances between the mobile device and the server. Similar issues arise for fixed devices, when the application requires a combination of high processing power and low latency. For example, many video gaming environments are markedly impacted by low processing power of the fixed devices and latency with servers.

SUMMARY

A method is implemented by a nano-box for providing processing resources to support application execution to a set of devices connected to a network of the nano-box. The processing resources improve performance of the set of devices, where the set of devices include a mobile device or a fixed device. The nano-box is selected by a root controller to provide the processing resources from a set of nano-boxes connected to the network based on determining the nano-box provides better metrics for the set of devices than other nano-boxes in the set of nano-boxes. The method includes receiving application data for an application authorized for a mobile or fixed device over the network. The application data is specific to the mobile or fixed device. The application is executed using the application data of the mobile or fixed device to generate an output. A handoff notification is received indicating that the root controller has reassigned the application to another nano-box in the set of nano-boxes based on best resource availability and minimum latency. In response, the nano-box updates the application data with a current state of the application and transmits the updated application data over the network to be provided to the other nano-box.

A nano-box provides processing resources to support application execution to a set of devices connected to a network of the nano-box. The processing resources improve performance of the set of devices. The set of devices include a mobile device or a fixed device, where the nano-box is selected by a root controller to provide the processing resources from a set of nano-boxes connected to the network based on determining the nano-box provides better metrics for the set of devices than other nano-boxes in the set of nano-boxes. The nano-box includes a storage device to store application data, a network interface to communicate with the network and a computer processor coupled to the network interface and the storage device. The computer processor is configured to receive the application data via the network interface for an application authorized for a mobile or fixed device over the network. The application data is specific to the mobile or fixed device. The computer processor executes the application using the application data of the mobile or fixed device to generate an output. The computer processor can receive a handoff notification indicating that the root controller has reassigned the application to another nano-box in the set of nano-boxes based on best resource availability and minimum latency. In response, the computer processor can update the application data with a current state of the application and transmit the updated application data over the network via the network interface to be provided to the other nano-box.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
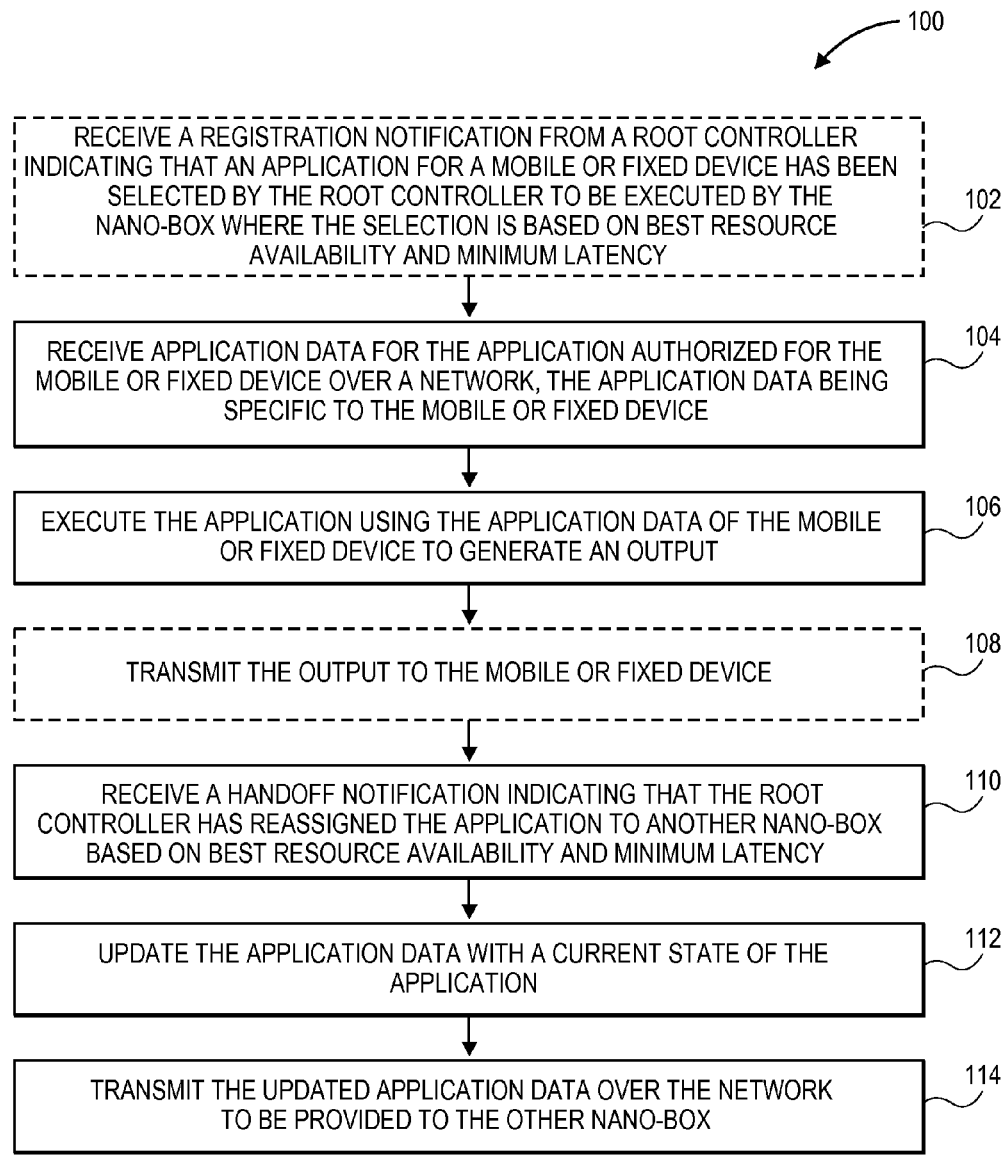
FIG. 1 is a flowchart of one embodiment of a process for implementing a nano-box to reduce network latency and resource requirements for a mobile or fixed device.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). A 'set,' as used herein, refers to any positive whole number of items. The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router, switch, bridge) is a piece of networking equipment, including hardware and software that communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, global positioning system (GPS) units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Overview

The embodiments of the invention described herein below provide a method and system for implementing "Mist Networks" or "MistNets." A MistNet includes multiple nano-boxes, which are small size computing devices, relative to server farms and data centers that are highly distributed and have low network latency. Nano-boxes can be deployed individually or in clusters to provide additional processing power and storage capacity to other computing devices connected to the MistNet. The MistNet also includes one or more root controllers which determine initial assignment of nano-boxes to assist mobile and fixed devices as well as control data exchange between the mobile or fixed devices and the MistNet in real-time. The root controllers route data traffic and enable handoffs between nano-boxes as the mobile devices move to different locations.

Due to processing power and storage space constraints in mobile devices and some fixed devices, some applications are unable to run on these devices. For example, applications such as augmented reality, speech translation, face recognition and even some games require resources beyond that which can be fitted into a mobile device or some fixed devices. To make these applications available to these mobile and fixed device users, the processing and storage associated with the applications are offloaded to data centers. These data centers are typically located near the backbone of the network or near a cooling facility. A resource intensive application is executed at a data center, and the output is transmitted to these mobile and fixed devices.

The disadvantages of the prior art include that network latency can reduce the user experience, especially for time sensitive applications such as games. Due to the time it takes for data to travel between the data center and the mobile or fixed device, the user can experience noticeable delays while using the application. Additionally, executing smaller applications directly on the mobile or fixed device can pose high security risks due to viruses or the possibility of losing a mobile device that holds critical data. It also increases the amount of data that is exchanged over the mobile device's wireless radio interface, which places a higher demand on the radio access network (RAN) and drains the battery of the mobile device.

The embodiments of the present invention overcome the disadvantages of the prior art by defining a MistNet, which is a dense, highly distributed and low latency network of nano-boxes that perform cloud computing for mobile and fixed devices. MistNets can be deployed in both fixed and mobile broadband networks. The close proximity of the nano-boxes in a MistNet reduces latency and improves response times for user interactions. In turn, new services and applications can be provided to users immediately, without the user having to download the entire application onto a mobile or fixed device. For example, a mobile or fixed device can make use of one or more virtual machines (VMs) running in the mist without having to worry about the limited physical capabilities of the user's mobile or fixed device. In some embodiments, when a new version of an application is available, only the mist needs to update the application, and not each individual mobile or fixed device. This reduces the amount of data traffic on the mobile or wired broadband network and conserves power in the mobile devices and storage space in the mobile and fixed devices.

In one embodiment, a method is executed by a computer system implementing a nano-box to process and store data for an application that is authorized for a mobile device. The nano-box is coupled via a network to a wireless transceiver for communicating with the mobile device. The nano-box includes a network interface (typically but not necessarily wired) for communicating with the wireless transceiver and for communicating over the network with a root controller. The root controller manages the assignment of devices and applications to a plurality of nano-boxes and enables handoff of sessions among a plurality of nano-boxes.

The method improves user experience for the mobile device by reducing network latency to the mobile device. The method includes receiving a registration notification from the root controller indicating that a given nano-box is to provide the services of a particular application or set of applications to a specified mobile device. The selection of the particular nano-box is made by the root controller for example based on determining the controller with the best resource availability. The best resource availability can be where there is an estimated latency to the mobile device that is less than 50 milliseconds (ms). The data for the application authorized for the mobile device is received over the network. This data is specific to the mobile device. The application is executed using the mobile device specific data to generate an output. The output is transmitted wirelessly to the mobile device.

There may be multiple exchanges of data between the mobile device and the application, with multiple inputs from and outputs to the mobile device. During operation, a handoff notification may be received by the nano-box indicating that the root controller has decided that the service should be moved to a different nano-box. This decision could be made, for example, based on the root controller concluding that the round-trip network latency to the mobile device is no longer less than 50 milliseconds. The application data is updated with a current state of the application. The updated application data is transmitted over the network to the root controller.

In another embodiment, a computer system implements a nano-box to process and store a data for an application that is authorized for a mobile device. The nano-box is coupled to a root controller, the root controller to enable initial authorized service delivery to a mobile device and handoff among a plurality of nano-boxes. The computer system to improve user experience for the mobile device by reducing network latency to the mobile device. The computer system comprises a network interface configured to communicate with the mobile device and the root controller. The network interface can include a wired transceiver and/or a wireless transceiver. The computer system also includes a storage device configured to store the application data. The computer system includes a computer processor coupled to the network interface and the storage device.

The computer processor is configured to receive a registration notification from the root controller indicating that a given nano-box is to provide the services of a particular application or set of applications to a specified mobile device. The selection of the particular nano-box is made by the root controller. The selection by the root controller can be based on determining the nano-box with the best resource availability. For example the best resource availability can be based on latency estimated to be less than 50 milliseconds (ms) to the mobile device. The process can further include receiving the data for the application authorized for the mobile device over the network. The data can be specific to the mobile device. The process can execute the application using the mobile device specific data to generate an output, to transmit the output to the mobile device, and to receive a handoff notification indicating that the root controller has decided that the service should be moved to a different nano-box. This decision could be made, for example, based on the root controller concluding that the round-trip network latency to the mobile device is, for example, no longer less than 50 milliseconds. In this situation, an update of the application data with a current state of the application is performed and the updated application data is transmitted over the network to the root controller.

Further, fixed devices, i.e., devices that do not typically roam, such as desktop computers, also are affected by latency and limits in processing power for their fixed device applications. Some fixed devices, such as console devices and older desktop devices can have limited memory and processing power, which prevent them from taking advantage of new more resource intensive applications. Similarly, these fixed devices can be remote from data centers, cloud computing facilities and similar resources causing degradation in performance when accessing resources and applications hosted by such facilities. Also, some fixed devices can be designed to have very low resources similar to that typically associated with mobile devices, making these devices lower cost or smaller. Such fixed devices can also include computing devices embedded in consumer electronics such as televisions and other appliances.

FIG. 1 is a flowchart of one embodiment of a process implemented by a nano-box to reduce network latency and resource requirements for a mobile device or fixed device. The process is typically implemented by a computer processor. A nano-box includes at least one computer processor and at least one storage device. The computer processor can be any type of processing device including a general or central processing unit, an application specific integrated circuit (ASIC) or similar processing device. The computer processor can be connected with the storage device by a set of buses routed over a set of mainboards or similar substrates coupled to each other. Alternatively, the computer processor and the storage device can be connected through a network.

In one embodiment, the process starts with Block 102 where the nano-box receives a registration notification from a root controller indicating that a mobile device or fixed device has been assigned to the nano-box or more specifically that an application to be utilized by the mobile or fixed device has been assigned to the nano-box for execution. The root controller can use any process for selecting which nano-box in a MistNet is assigned to the mobile or fixed device. In one embodiment, the root controller may select the nano-box with the best resource availability and/or the lowest latency. The best resource availability can be determined using any algorithm and any metrics reported by the nano-box to the root controller. In one embodiment, the metrics can include processor or storage metrics.

The latency can also be associated with a threshold value, where the threshold defines an acceptable maximum latency. In one example embodiment, the root controller attempts to assign a nano-box that has a 50 millisecond (ms) or lower latency to the mobile or fixed device. In one embodiment, the selected nano-box can be the closest nana-box to the mobile or fixed device based on the minimal latency amongst the possible nano-boxes available in the MistNet to handle the mobile or fixed device.

The root controller performs the registration of mobile and fixed devices as they enter or connect to the MistNet. The root controller can reside on a nano-box, or it can reside on a different network device, such as an edge router, in the MistNet or in the RAN. The root controller can be executed by a single device, a set of devices or can be distributed across multiple devices in the MistNet. When the mobile or fixed device registers with the root controller, the root controller transmits the registration notification to the nano-box to inform the nano-box that it will be performing processing for the mobile device. The registration notification can include identification information for the mobile device including device type or capability information, device location information such as an Internet Protocol (IP) address or similar information. The registration notification can be transmitted using any type or combination of communication protocols including machine-to-machine communication protocols. The initial registration can also identify an application or set of applications that the newly registered device is executing or that it recently or commonly utilizes. The applications can be identified using any type of identifier such as a name, resource locator or similar identifier.

At Block 104, the nano-box receives data for an application that is authorized for the mobile or fixed device over a wired, wireless or similar network. An authorized application can be any application that the root controller or other authorization controller determines is supported by the MistNet, owned by the user of the mobile or fixed device, approved for operation by a network provider or similarly authorized. The application can be configured such the mobile or fixed device can have either a client of the application or the full application being executed or commonly in use on the mobile or fixed device. The processing requirements of the application may exceed what the mobile or fixed device is capable of or may simply add a significant load to the mobile device if solely processed at the mobile or fixed device. The nano-box executes the server component of the application, the full application or any combination of the application's functionality to lighten the load of the mobile or fixed device. For sake of clarity, the nano-box is described herein as executing the application, however, one skilled in the art would understand that the nano-box and mobile or fixed device share at least some of the functions of the application, with the mobile or fixed device providing user interface aspects and the nano-box executing resource intensive functions of the application in many embodiments. The embodiments describe an example of the handling of a single application of a single mobile device. However, the principles, processes and structures described herein can be utilized with a system that can handle any number of mobile or fixed devices, supported by any number of nano-boxes in a network, where each nano-box can host any number of applications to offload execution of any number of applications for any number of mobile or fixed devices assigned to the nano-box by a set of root controllers. A 'set,' as used herein can refer to any positive whole number of items including one item.

The application data that is received is specific to the mobile or fixed device, the user of the device, and/or an instance of the application. The application data can include information such as the state of the application after it was last executed and other user, device or application specific information. In one embodiment, the application data is received from a storage server through the internet. This storage server can be co-located with the root controller, any nano-box or independently positioned in the MistNet. In another embodiment, the application data is received from a different nano-box that the mobile or fixed device was last associated with. The application data can be received in the form of one or more internet protocol (IP) packets or have any other format or structure.

At Block 106, the nano-box executes the application using the user, device, or application specific data to generate an output. In one embodiment, the nano-box stores the most commonly used applications in a local storage device. A first time or each time the nano-box executes the application, the nano-box checks to see if the application is already in the local storage device. If it is not, the application can be retrieved from a storage server through a network such as a local area network (LAN) or wide area network (WAN), for example, the Internet. By retrieving and using the user, device and application specific data to execute the application, the offloading process appears seamless to the user since the application picks up where the user last left off, regardless of whether the last operation of the application was handled by another nano-box or occurred at any time in the past. The output that is generated can be the result of user interaction with the application or any automated application function. The generated output can have any form, content or size. The generated output can be a data structure with computed values, video, audio or similar content. The generation of the output can be a one-time occurrence, periodic, or continuous. For sake of clarity, the example is discussed as though the output were a single occurrence; however, one skilled in the art would understand that it can be periodic or continuous.

After the output is generated, the output is transmitted to the mobile or fixed device through a wireless (e.g., over a radio access network (RAN) or local area network (LAN)), fixed broadband network or any combination thereof (Block 108). The output can be transmitted through a network interface that is connected to the nano-box using any type or combination of communication protocols including machine-to-machine communication protocols. In one example embodiment, the output is transmitted using a combination of hypertext markup language 5 (HTML5) and Asynchronous JavaScript and XML (AJAX) messages.

The output can be received by a local component (i.e., client) of the application on the mobile or fixed device, where the local component can be primarily configured to communicate with the nano-box and provide a user interface to the user, but is not configured to actually perform any substantive processing for the application. In other embodiments, the local or client application can execute a range of functionality for the application as needed and as is most optimal for the application. The local or client application can be a native application that is developed specifically for a particular mobile or fixed platform. Alternatively, the local or client application can be developed using more universally standardized languages such as HTML. In a preferred embodiment, the local or client application is coded using a combination of the native application language and HTML5. The local or client application displays the output on the user interface after receiving the output.

At Block 110, the nano-box can receive a handoff notification indicating that the nano-box is to hand off the execution of the application and general servicing of a mobile or fixed device to another nano-box. This notification can be received at any point in the execution of the application by the nano-box and after any duration of execution. In some embodiments, the notification indicates that the nano-box is not the nano-box in the network with the best resource availability or lowest latency for supporting the mobile or fixed device. The notification can similarly indicate a threshold has been met for some metric such that the cost of the transfer of the application to another nano-box, in terms of the overhead associated with the transfer, is outweighed by the reduced latency and improved performance of the application resulting from such a transfer. The handoff notification can be received from the root controller, which tracks the latency, resource metrics and/or location of the nano-box and the mobile or fixed device, in the form of any type or combination of communication protocols including machine-to-machine communication protocols. The handoff notification informs the nano-box that the nano-box will no longer be executing the application for the mobile or fixed device due to the increased latency or similar performance issue. This hand-off process is most frequently to be applicable to mobile devices that roam over significant distances, which can significantly affect latency and similar metrics. However, it can also apply to fixed devices that are relocated, where the load on an assigned nano-box may increase or where the capabilities of the nearby nano-boxes otherwise shifts (e.g., a new nano-box is added to the MistNet).

At Block 112, the nano-box updates the application data with a current state of the application. This stores the current state of the application so that the next nano-box that the mobile or fixed device associates with can resume processing of the application at the same point in its execution. This update can be executed in response to the handoff notification or can be executed periodically or continuously. At Block 114, the updated application data is transmitted over the network to the root controller. The root controller can then transmit the updated application data to a storage server or to the next nano-box. In other embodiments, the application data can be transmitted directly between the nano-boxes. The current nano-box can send the application and state data to the new nano-box selected by the root controller. The updated application data can be transmitted in any form for example in the form of one or more IP packets having any structure or format.

Figure 2:
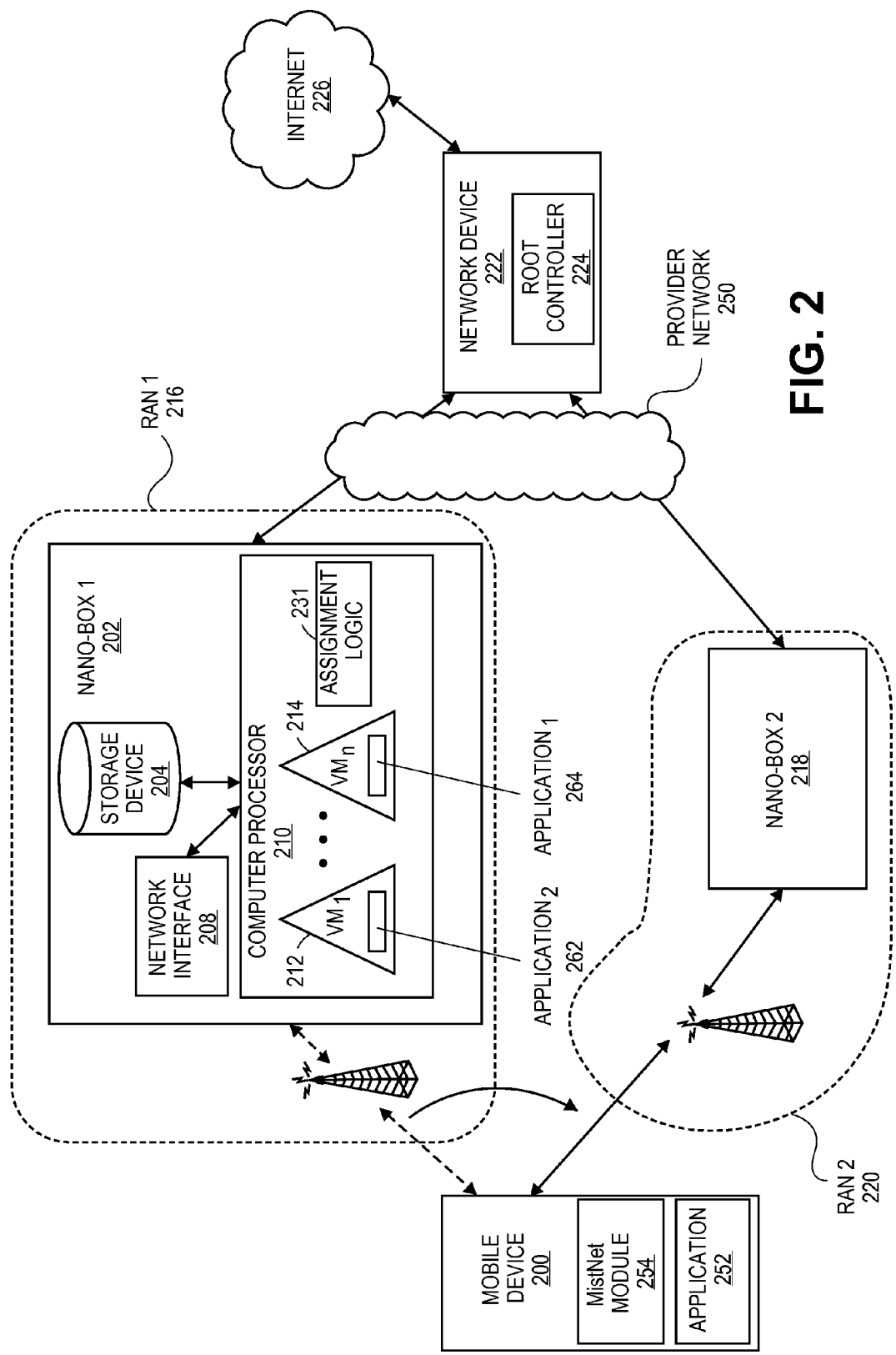
FIG. 2 is a diagram of one example embodiment of a MistNet that includes multiple nano-boxes to reduce network latency for a mobile device.

FIG. 2 is a diagram of one example embodiment of a MistNet that includes multiple nano-boxes 202 and 218 to reduce network latency and resources for a mobile or fixed device 200. The illustration is provided by way of example rather than limitation. While an example of a mobile node is shown, one skilled in the art would understand that the MistNet can be utilized with fixed nodes and using any type of wired or wireless network. The example of the illustration for sake of clarity is utilized to demonstrate the principles and structures of a MistNet. The MistNet is shown having a single mobile device 200, single root controller 224, and two nano-boxes 202 and 218 connected by two RANs 216 and 220 and a provider network 250 (or similar network between RANs and root controller 224) and an Internet connection 226. One skilled in the art would understand that a MistNet can be scaled to include any number of mobile devices, RANs, nano-boxes and root controllers having any relative configuration. The 'MistNet' refers to the overall network of nano-boxes encompassing the connecting networks and the connected mobile or fixed devices as well as the root controllers.

In the illustrated example, the MistNet includes a root controller 224 implemented on network device 222, server or similar device. In other embodiments, there can be more than one root controller, and the root controller can be implemented on a nano-box rather than a network device. Network device 222 is connected with the Internet 226 or similar wide area network. As discussed above, the system can include any number of mobile (or fixed) devices and include any number of nano-boxes, and root controllers to enable the offloading of any number of applications from the devices being serviced. The illustration and example are simplified for sake of clarity to show a single mobile device transitioning between two nano-boxes in a simple MistNet deployed over a set of RANs that are part of a cellular provider's network.

The first nano-box 202 includes a storage device 204, a network interface 208, and a computer processor 210 connected with storage device 204 and network interface 208. Computer processor 210 can be any implemented with any number or type of processing device including a general or central processing unit, an application specific integrated circuit (ASIC) or similar processing device. Computer processor 210 can be connected with storage device 204 and network interface 208 by a set of buses routed over a set of mainboards or similar substrates coupled to each other. The network interface can be configured to communicate with the root controller and other nano-boxes over any network, including a wide area network such as a provider network 250. The network interface 208 can be configured to communicate with mobile (or fixed) devices through the towers of the RAN 216 or similar broadband networks. Alternatively, computer processor 210 and storage device 204 can be distributed and connected through a network. Although not depicted in this figure, second nano-box 218 (and other nano-boxes) can include the same or similar components as first nano-box 202.

Nano-boxes 202 and 218 can be positioned in the MistNet as individual nano-boxes or clusters of nano-boxes assembled using multiple computer systems to increase processing and storage resources. Nano-boxes 202 and 218 can be located at the operator's network access level, e.g., at the radio base station (RBS), the access node, or the IP edge of a RAN. In this example embodiment, first nano-box 202 is deployed in a first RAN 216 and a second nano-box 218 is deployed in a second RAN 220. In other embodiments, a single RAN can include multiple nano-boxes or clusters of nano-boxes. Similarly, the nano-boxes, in other embodiments, can be in positioned in other types of broadband networks or mixed between different types of broadband networks.

In this example, a local or client application 252 is executed on mobile device 200. When mobile device 200 is connected to the network the mobile device 200 or the local application can register with root controller 224. In other embodiments, the mobile device 200 can execute a specialized MistNet module 254 or similar software that facilitates registration and client application interaction with assigned nano-boxes. The registration messages can be transmitted through first nano-box 202 or directly with the root controller. In one embodiment, when the mobile device 200 or local application 252 registers, it receives static elements for one or more virtual machines (VMs) 212, 214 associated with mobile device 200, such as VMs associated with or executing the applications that are authorized for the mobile device 200, icons, and layout. In one embodiment, the static elements are cached by mobile device 200.

After the registration process, the root controller 224 selects the best nano-box to assist the mobile device 200 and its applications 252 and passes the application data to the selected nano-box 202. In the example, the first nano-box 202 is selected and executes VMs 212, 214 and applications 262, 264 for mobile device 200 and transmits the output to mobile device 200 according to any of the embodiments described herein-above. More specifically, the VMs 212, 214 and applications 262, 264 are executed by computer processor 210 in the first nano-box 202. The implementation of the processes to instantiate the VMs 212, 214 and transfer application data can be controlled remotely by the root controller 224 or locally in coordination with or independent of the root controller 224. The local assignment logic 231 can be executed by the computer processor 210 of the nano-box 202. In some embodiments, a root controller 224 can be absent from the system and the nano-boxes can coordinate the assignment and transfer of application data in a distributed manner via the assignment logic 231.

If computer processor 210 has multiple cores or implements some other technology such as hyper-threading, which enables the processing of multiple threads of instructions at the same time, computer processor 210 can simultaneously execute multiple VMs 212, 214. In this embodiment, computer processor 210 executes n number of VMs 212, 214. The multiple VMs 212, 214 can be all for mobile device 200 or some VMs 212, 214 can be executed for other mobile devices connected with the first RAN 216. Within each VM 212-216, multiple applications can be executed.

When mobile device 200 moves out of range of the first RAN 216 and into range of the second RAN 220, root controller 224 detects the change in metrics and manages the handoff of the VMs 212, 214 and applications 262, 264 from first nano-box 202 to second nano-box 218. In other embodiments, a fixed or mobile device 200 isn't shifting between RAN connections; instead, the root controller 224 decides to reassign applications 262, 264 between nano-boxes 202, 218 based on any type of performance metrics such as resource availability and latency. In one embodiment, the handoff is performed using software defined networking (SDN) technologies. The root controller 224 manages the handoff by transferring VM and/or application data that is specific to mobile device 200 or its applications from the first nano-box 202 to the second nano-box 218. After the handoff, the second nano-box 218 executes the VMs 212, 214 and applications 262, 264 for mobile device 200 according to any of the embodiments described herein-above.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method implemented by a nano-box for providing processing resources to support application execution to a set of devices connected to a network of the nano-box, the processing resources to improve performance of the set of devices, the set of devices including a mobile device or a fixed device, where the nano-box is selected by a root controller to provide the processing resources from a set of nano-boxes connected to the network based on determining the nano-box provides better metrics for the set of devices than other nano-boxes in the set of nano-boxes nano-box, the method comprising the steps of:
receiving application data for an application authorized for a mobile or fixed device over the network, the application data being specific to the mobile or fixed device;
executing the application using the application data of the mobile or fixed device to generate an output;
receiving a handoff notification indicating that the root controller has reassigned the application to another nano-box in the set of nano-boxes based on best resource availability and minimum latency;
updating the application data with a current state of the application; and
transmitting the updated application data over the network to be provided to the other nano-box.

2. The method of claim 1, further comprising the step of:
receiving a registration notification from the root controller indicating that the application for the mobile device or the fixed device has been selected to be executed by the nano-box where the selection is based on best resource availability and minimum latency.

3. The method of claim 1, further comprising the step of:
transmitting the output to the mobile or fixed device.

4. The method of claim 1, wherein the network is a radio access network.

5. The method of claim 4, wherein the nano-box is located at a radio base station in the radio access network.

6. The method of claim 2, wherein the minimum latency is 50 milliseconds.

7. The method of claim 1, wherein transmitting the updated application data further comprises the step of:
transmitting the application data to a storage server.

8. The method of claim 1, wherein transmitting the updated application data further comprises the step of:
transmitting the application data to the root controller.

9. The method of claim 1, wherein the executing of the application further comprising the step of:
executing the application in a virtual machine on the nano-box.

10. A nano-box for providing processing resources to support application execution to a set of devices connected to a network of the nano-box, the processing resources to improve performance of the set of devices, the set of devices including a mobile device or a fixed device, where the nano-box is selected by a root controller to provide the processing resources from a set of nano-boxes connected to the network based on determining the nano-box provides better metrics for the set of devices than other nano-boxes in the set of nano-boxes, the nano-box comprising:
a storage device to store application data;
a network interface to communicate with the network; and
a computer processor coupled to the network interface and the storage device, the network interface configured to receive the application data via the network interface for an application authorized for a mobile or fixed device over the network, the application data being specific to the mobile or fixed device, to execute the application using the application data of the mobile or fixed device to generate an output, to receive a handoff notification indicating that the root controller has reassigned the application to another nano-box in the set of nano-boxes based on best resource availability and minimum latency, to update the application data with a current state of the application, and to transmit the updated application data over the network via the network interface to be provided to the other nano-box.

11. The nano-box of claim 10, wherein the computer processor is further configured to receive a registration notification via the network interface from the root controller indicating that the application for the mobile device or the fixed device has been selected to be executed by the nano-box where the selection is based on best resource availability and minimum latency.

12. The nano-box of claim 10, wherein the computer processor is further configured to: transmit the output to the mobile or fixed device.

13. The nano-box of claim 10, wherein the network is a radio access network.

14. The nano-box of claim 13, wherein the nano-box is located at a radio base station in the radio access network.

15. The nano-box of claim 11, wherein the minimum latency is 50 milliseconds.

16. The nano-box of claim 10, wherein the computer processor is further configured to transmit the application data to a storage server.

17. The nano-box of clasim 10, wherein the computer processor is further configured transmit the application data to the root controller.

18. The nano-box of claim 10, wherein the computer processor is further configured to execute the application in a virtual machine.

* * * * *

UNITED STATES PATENT AND TRADEMARK OFFICE
CERTIFICATE OF CORRECTION

PATENT NO.       : 9,118,681 B2  
APPLICATION NO.  : 13/909958  
DATED            : August 25, 2015  
INVENTOR(S)      : Haddad et al.

Page 1 of 1

It is certified that error appears in the above-identified patent and that said Letters Patent is hereby corrected as shown below:

On the title page item 74 under "Attorney, Agent, or Firm", in Column 2, Line 2, delete "Elliot," and insert -- Elliott, --, therefor.

In the claims

In Column 12, Line 61, in Claim 17, delete "clasim" and insert -- claim --, therefor.

Signed and Sealed this  
Tenth Day of May, 2016

Michelle K. Lee  
*Director of the United States Patent and Trademark Office*